Figure 1:
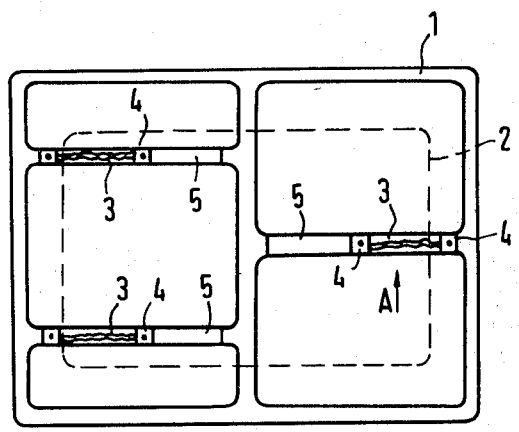

United States Patent [19]

Schlayer et al.

[11] 4,348,017
[45] Sep. 7, 1982

[54] BEARING FOR FACEPLATE PANELS OF COLOR-PICTURE TUBES

[75] Inventors: Wolfgang Schlayer, Stuttgart; Herbert Hemminger, Schorndorf, both of Fed. Rep. of Germany

[73] Assignee: International Standard Electric Corporation, New York, N.Y.

[21] Appl. No.: 158,847

[22] Filed: Jun. 12, 1980

[30] Foreign Application Priority Data

Sep. 27, 1979 [DE] Fed. Rep. of Germany ....... 2939143

[51] Int. Cl.³ .............................................. B23Q 3/00
[52] U.S. Cl. .................................. 269/296; 29/25.19; 248/618; 269/908
[58] Field of Search ............... 29/25.19; 269/296, 908; 65/106, 118; 248/618

[56] References Cited

U.S. PATENT DOCUMENTS

| | | | |
|---|---|---|---|
| 3,220,818 | 11/1965 | Barch et al. | 65/106 |
| 3,727,870 | 4/1973 | Bass | 248/618 |
| 3,806,312 | 4/1974 | McMaster et al. | 65/118 |
| 3,989,233 | 11/1976 | Wardell, Jr. | 269/908 |

Primary Examiner—Kenneth J. Ramsey
Attorney, Agent, or Firm—John T. O'Halloran; Peter C. Van Der Sluys

[57] ABSTRACT

During color-picture tube manufacture, faceplate panels must be set down on conveying devices several times. To prevent damage to the faceplate glass when the panels are being set down, the bearing on the conveying device is a wire fabric.

5 Claims, 2 Drawing Figures

BEARING FOR FACEPLATE PANELS OF COLOR-PICTURE TUBES

The present invention relates to a bearing for setting down faceplate panels during the manufacture of color-picture tubes.

Essential components of a color-picture tube are the glass faceplate panel, hereinafter referred to as "panel", and the shadow mask, hereinafter referred to as "mask". The mask is detachably connected with the panel. Before being joined to a funnel section, this combination is called a "mask-panel assembly", hereinafter referred to as "assembly".

After insertion of the mask into the panel, the panel is heated, e.g. to about 500° C., in order to relieve mechanical stresses caused during insertion. This process is called "stabilizing".

In the further course of the color-picture tube manufacture, a luminescent screen is placed on the panel. The volatile matter contained in this screen is removed by baking, e.g. at about 480° C.

While being transported from one production machine to the other, or in the machines themselves, the panels or assemblies must be placed on the bearing surface of a conveying device. The bearing should not appreciably change its mechanical and chemical properties up to the stabilizing and baking temperatures.

The bearings are commonly made of asbestos. When the panel is being set down, the asbestos bearing yields to prevent damage to the panel, but fibers may easily be separated from the asbestos, which are then whirled up by the strong currents of air at the entrances to the stabilizing and baking furnaces and, thus, carried into the assembly. These fibers frequently settle in the mask apertures, and this is clearly visible on the finished tube in the form of dark screen areas, which are not hit by electron beams.

To preclude the separation of fibers, the asbestos is used in the form of asbestos cement, which is obtainable in qualities of different brittleness and hardness. It has turned out, however, that fibers separate even from asbestos cements, which are not hard enough for a bearing.

The object of the invention is to provide an elastic, temperature-resistant bearing for panels of color-picture tubes which also exhibits high abrasion resistance.

This object is achieved as set forth in the characterizing part of the main claim. Wire fabrics surprisingly proved so elastic that, in experiments conducted so far, no damage to the glass of the panel could be detected. The wire-fabric bearings are heat- and abrasion-resistant. Preferred embodiments are given in the subclaims.

The embodiment using a resilient metal link prevents damage even if the panel is set down very roughly.

Figure 2:
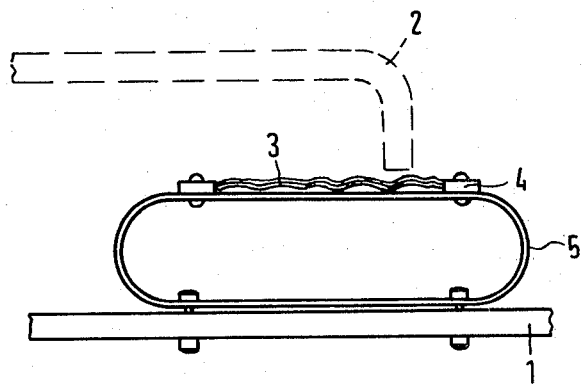

Embodiments of the invention will now be explained in more detail with reference to the accompanying drawing, in which:

FIG. 1 is a top view of a rack for setting down panels for color-picture tubes, and FIG. 2 shows a portion of the rack of FIG. 1 as viewed from the direction A.

FIG. 1 is a top view of a rack 1, on which panels 2 (dashed line) for color-picture tubes can be placed. This rack is used to set down a panel horizontally; it is also possible to use racks for setting down the panels in an oblique position, which, however, is of no consequence for the bearings used. A wire-fabric bearing 3 is connected with the rack 1 by fasteners 4 and a resilient metal link 5. FIG. 2 shows the metal link 5 with the bearing 3 as seen when looking in the direction A of FIG. 1.

The bearing is preferably a fabric made of stainless steel, e.g. $\times$ 12 Cr Ni 188 with a wire thickness of 0.24 mm. Particularly advantageously, the fabric is heavily corrugated. Several, e.g. four, layers of a commercially available fabric, e.g 200 mm in length, are placed one on top of another, inserted into a short length of tubing, and fastened therein by crimping.

The fabric 3 is mounted on the rack 1 by means of the tube length fasteners 4 either directly or via the link 5. The link is made of sheet steel two millimeters thick, e.g. $\times$ 12 Cr Ni 177. It absorbs shocks if the panel is put down very roughly.

The bearings so far described are mechanically resistant and stainless at least up to the stabilizing and baking temperatures. For bearings used only at room temperature, it is, of course, possible to use fabrics of metals which are not heat-resistant.

We claim:

1. A support assembly, comprising:
    a rigid support member;
    resilient link means mounted to said support member; and
    wire fabric disposed on said resilient link means to provide a generally upwardly facing support surface wherein a portion of said link means is coextensive with and beneath said support surface.

2. A support assembly as described in claim 1, wherein the wire fabric is heat-resistant up to at least 500° C.

3. A support assembly as described in claim 1, wherein the wire fabric is made of stainless material.

4. A support assembly as described in claim 2, wherein the wire fabric is made of stainless material.

5. A support assembly as described in claim 1, wherein the resilient link means comprises a resilient metal link.

* * * * *